United States Patent [19]

Krieger et al.

[11] Patent Number: 4,480,700
[45] Date of Patent: Nov. 6, 1984

[54] MECHANICAL DIFFERENTIAL-RATE COUNTERBORING TOOL

[75] Inventors: Raymond L. Krieger, Denver, Colo.; Steven J. Volna, Minneapolis, Minn.; Edward T. Able, Denver, Colo.

[73] Assignee: Sargent Industries, Inc., Los Angeles, Calif.

[21] Appl. No.: 365,510

[22] Filed: Apr. 5, 1982

[51] Int. Cl.³ .................................................. B23B 47/18
[52] U.S. Cl. ............................................ 173/145; 82/1.4; 82/2 E; 408/137; 409/185
[58] Field of Search .................. 408/137, 138, 133; 10/138; 82/1.4, 2 E, 1.2; 173/145, 141, 149, 148; 409/185

[56] References Cited

U.S. PATENT DOCUMENTS

| | | | |
|---|---|---|---|
| 367,472 | 8/1887 | Thornton | 408/137 X |
| 2,152,293 | 3/1939 | Wagner | 77/32 |
| 2,283,323 | 5/1942 | Erhardt | 82/2 E |
| 2,299,843 | 10/1942 | Mueller | 408/137 X |
| 2,722,855 | 11/1955 | Van Scoy | 77/37 |
| 2,950,490 | 8/1960 | Schwartz et al. | 10/138 |
| 3,124,817 | 3/1964 | Mosier | 10/128 |
| 3,331,266 | 7/1967 | Brooks | 77/2 |
| 3,623,823 | 11/1971 | Val | 408/137 X |
| 3,661,470 | 5/1972 | O'Pry | 408/137 |
| 3,804,545 | 4/1974 | Chistov et al. | 173/145 X |
| 4,097,177 | 6/1978 | Close | 409/185 |

FOREIGN PATENT DOCUMENTS 63579 6/1949 Netherlands ............ 173/145
21771 of 1914 United Kingdom ....... 173/145

Primary Examiner—William R. Briggs
Attorney, Agent, or Firm—John R. Ley

[57] ABSTRACT

A boring tool particularly useful for cutting counterbores in an engine block includes means for selectively engaging and disengaging an output shaft which is rotated and axially advanced during the cutting operation. Preferably, the selective engaging and disengaging means includes feed threads formed on the output shaft, and a threaded means which is selectively moveable into and out of threaded engagement with the feed threads on the output shaft. Preferably, the boring tool is of the differential-rate type wherein the output shaft is rotated at a first predetermined rotational rate and the threaded means is rotated at a second different predetermined rotational rate. The differential rotational rate establishes the advancement rate of the output shaft. The position of the output shaft and the cutter element it carries can be readily adjusted without necessity of operating the boring tool to establish the cutter position. The selective engaging and disengaging means allows different length output shafts to be substituted according to the location of the counterbore to be cut. A lower housing subassembly is employed for adequately supporting the longer output shaft against spurious movement during cutting. A mechanical arrangement of elements secures the differential rotational rate, and a clutch bearing assembly is employed to terminate the differential rotational rate once the cutting has progressed to a predetermined depth.

11 Claims, 13 Drawing Figures

MECHANICAL DIFFERENTIAL-RATE COUNTERBORING TOOL

This invention relates to boring tools, and more specifically to those types of boring tools used in the repair and maintenance of internal combustion engines having cylinder sleeves which are removable from the engine block.

Most heavy-duty, relatively expensive industrial engines, such as those used in tractor trucks, utilize cylinder sleeves in the engine block. The cylinder sleeves are fitted in a sealing relation to the block at the ends of the sleeves, and a coolant jacket is defined between the sleeve and the block for cooling the engine cylinder. A press-fit friction seal is achieved at the top of the cylinder sleeve adjacent the combustion chamber, and an O-ring type of sealing arrangement is employed at the bottom end of the sleeve adjacent the crankcase. After a period of use, most of which is prolonged and heavy due to the nature of the application of such engines, coolant leaks develop at the seals between the cylinder sleeve and the engine block. The leaks can result from stress cracks occurring in the block adjacent the cylinder sleeve. Erosion from the coolant continually circulating through the coolant jacket promotes and creates leaks. Electrolysis between the cylinder sleeve and the engine block degrades the contacting surfaces. Once leaks of a substantial magnitude develop, it is necessary to overhaul or repair the engine, since the leaking coolant fluid is emitted into the engine lubricating oil or into the combustion chamber.

One method of repair involves disassembly all of the essential moving parts and the cylinder sleeves from the engine block, and cutting counterbores at the upper and lower locations in the block where each cylinder sleeve was previously sealed to the engine block. Thereafter, an annularly-shaped upper counterbore insert is inserted in the upper counterbore adjacent the upper deck or surface where the engine head is connected to the engine block. A lower repair sleeve is fitted into the lower counterbore adjacent the crankcase. In effect, the upper counterbore insert and lower repair sleeve replace those areas of the engine block which were cracked from stress, eroded from coolant flow or subject to electrolysis degradation. New and effective coolant seals are achieved once the cylinder sleeve is inserted into and sealed to the upper counterbore insert and the lower repair sleeve.

One accepted method of cutting the counterbores requires removal of the disassembled engine block from the chassis of the vehicle in which it is mounted, and transportation of the engine block to the machine shop where the counterbores are cut by using stationary machine equipment. Complete removal of the engine block from the chassis in which it is mounted, transportation to the machine shop, and the charges by machinists increase the costs and time required for the engine overhaul. For these and other reasons, portable boring tools, for cutting the counterbores without removing the engine block from the chassis, have gained acceptance as an alternative method of repair. One such portable boring tool is disclosed in U.S. Pat. No. 3,331,266. However, certain disadvantages are inherent in certain prior portable boring tools, and it is to these disadvantages and other improved features that the present invention is addressed.

INVENTION SUMMARY

One disadvantage of prior portable boring tools is an inability to conveniently and quickly axially adjust the position of the cutting tool which is rotated and axially advanced to cut the counterbore. Before commencing the cutting of the counterbore, the cutting tool must be positioned in contact with the engine block and the axial depth of the counterbore to be cut must be established. After the counterbore has been cut, it is desireable to have the ability to quickly withdraw the cutting tool to an initial starting position in order to more rapidly prepare for cutting the next counterbore. In prior tools for cutting counterbores, the cutting tool is rotated a considerable number of revolutions for very slight axial advancement of the cutting tool. The relatively high number of revolutions of the cutting tool relative to its slow axial advancement allows a relatively low power source, such as a half inch electric drill, to be used for operating the boring tool. Consequently, it may take a number of minutes to cut a counterbore to a depth of less than one inch. A corresponding amount of time is required to operate the boring tool in reverse to retract the boring tool to its starting position. Some prior tools for cutting counterbores have provisions for rapidly retracting the shaft carrying the cutting tool after completion of the counterbore. None of the prior portable boring tools for cutting counterbores have, however, made provision for quickly and conveniently axially advancing the output shaft carrying the cutting tool to an initial starting position or to further advanced positions.

One of the broad aspects of the present invention relates to selectively engaging and disengaging the output shaft from the shaft advancement means of the boring tool, thereby allowing the output shaft position to be axially adjusted in the boring tool without operation of the boring tool. Means for establishing a differential rate of rotation of the output shaft and of a rotational member, such as a shaft feed gear housing, is employed in the present invention. Feed threads are formed on the output shaft. Threaded means, such as a nut assembly, is carried by the rotational member. The differential rotational rate between the feed threads of the output shaft and the threaded means carried by the rotational member establishes the rotational rate for axially advancing the output shaft. In order to adjust the axial position of the output shaft without operating the boring tool to create a relative rotational difference between the output shaft and the threaded means carried by the rotational member, the threaded means is preferably formed as a plurality of partial nut members, each of which is operatively retained for selective movement into threaded engagement with the feed threads of the output shaft and for selective movement to disengage the partial nut members from threaded engagement with the feed threads. Accordingly, by selectively moving the partial nut members to a disengaging position, the output shaft can be conveniently and quickly axially adjusted to any desired position. Thereafter, the partial nut members are moved into threaded engagement with the output shaft and the boring operation can rapidly commence.

According to another broad aspect to the present invention, means for selectively engaging and disengaging the feed threads of the output shaft is operative to avoid all interference and connection with the threaded means and the output shaft, thereby allowing one output shaft to be removed from the boring tool and another output shaft of different length to be inserted into the boring tool. For example, a shorter length output shaft is employed for boring the upper counterbore, and a longer output shaft is employed for boring the lower counterbore. By quickly substituting output shafts, it is unnecessary to very slowly advance or retract a single non-removable longer output shaft, as is common in prior boring tools. The longer and shorter output shafts of the present invention can be quickly substituted according to the boring application. Means in the form of a housing extension member and a housing centering member are effectively utilized with the longer output shaft to support the lower end of the longer output shaft and to center the boring tool with respect to the opening in the engine block and thereby quickly position the boring tool for cutting the lower counterbore.

According to another broad aspect of the present invention, a very reliable, compact mechanical arrangement is provided for mechanically establishing the differential rates of rotation for axially feeding the output shaft at a relatively low rate while rotating the output shaft, and for effectively controlling the maximum extent of axial advancement of the output shaft and cutter. In accordance with this aspect, a shaft advancement feed gear and feed gear housing rotational member are operatively rotated by a clutch bearing assembly. A depth adjusting nut is selectively positioned on the output shaft at a predetermined position relative to the feed gear housing, which establishes the depth of the counterbore cut. Once the predetermined depth has been attained, the depth adjustment nut contacts the feed gear housing and causes it to rotate in unison with the output shaft. The clutch bearing releases a torque-applying engagement to the feed gear and terminates the differential rate of rotation, thereby terminating the axial advancement at the predetermined desired depth of the counterbore cut.

Many other significant advantages and improvements are apparent from the following description of the invention set forth in relation to a detailed description of its preferred embodiment and drawings thereof.

BRIEF DRAWING DESCRIPTION

PREFERRED EMBODIMENT

Figure 1:
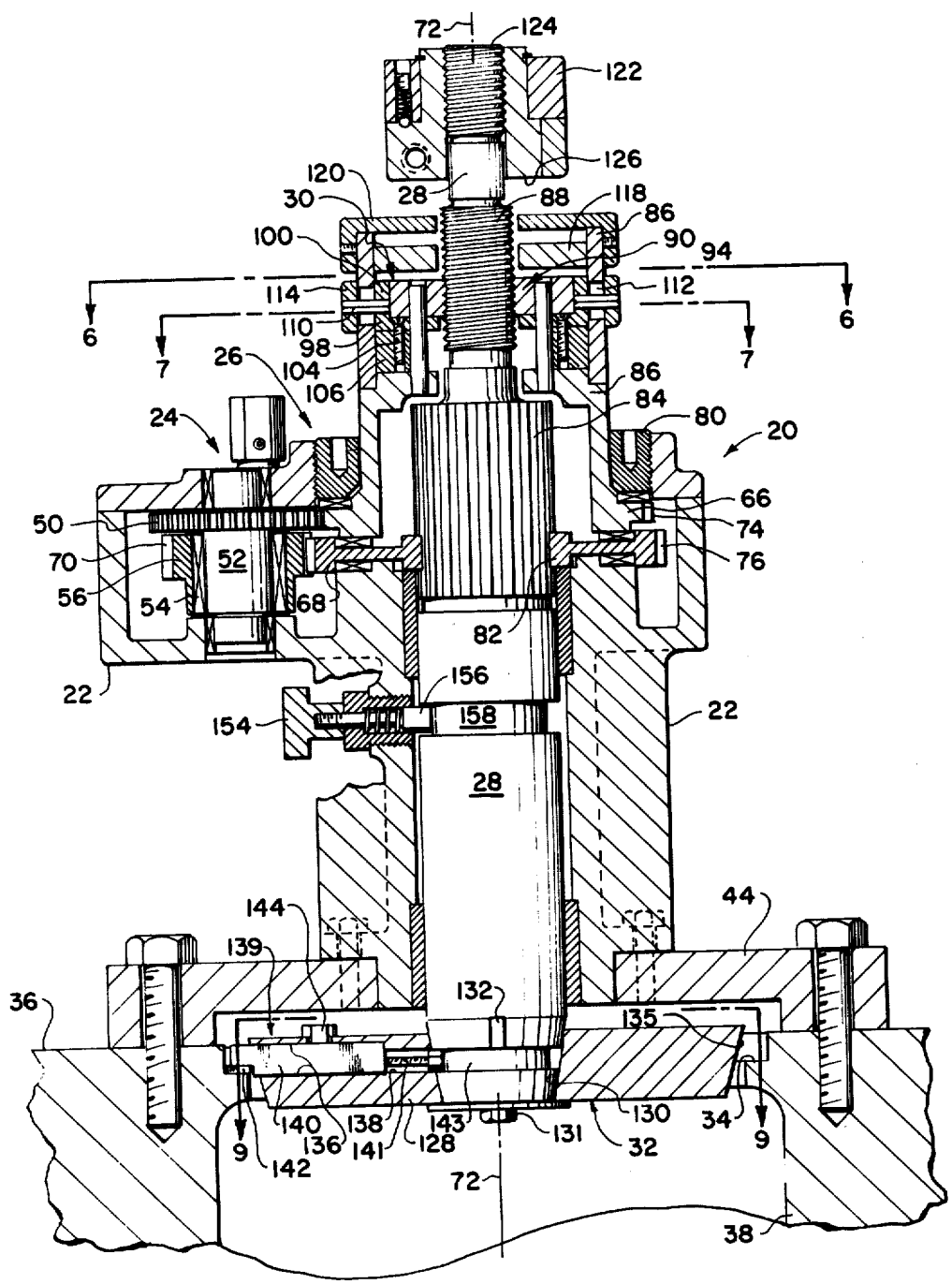
FIG. 1 is a vertical section view through the rotational axis of a preferred embodiment of the mechanical differential-rate boring tool of the present invention, shown in relation to a portion of an engine block and an upper counterbore adjacent the upper deck of the engine block.

The presently preferred embodiment of the mechanical differential-rate boring tool is referenced 20 in FIG. 1. The boring tool 20 generally comprises a main housing 22 from which various components of the boring tool 20 and its subassemblies are operatively retained. Rotational power for operating the tool 20 is applied to an input means or shaft 24. A shaft rotating and advancing means or subassembly 26 rotates an output shaft 28 and axially advances the output shaft at a relatively low rate as compared to the rotational rate of the shaft 28. A selective engaging and disengaging means or subassembly 30 is operative to selectively engage the shaft advancing means with the output shaft along a predetermined limited length of the output shaft 28 and to disengage the output shaft, and thereby allows the output shaft to be quickly initially positioned, or retracted after cutting is complete, or allows a longer output shaft 28' (FIG. 12) to be substituted in the boring tool 20 for the shorter output shaft 28. A tool holder and cutter subassembly 32 or 32' is attached to the lower terminal end of the output shaft 28 or 28', respectively, and is rotated and axially advanced by movement of the output shaft to cut an upper counterbore 34 adjacent the upper deck 36 or surface of the engine block 38 or cut a lower counterbore 40 (FIG. 12) adjacent the crankcase area 42 of the engine block 38, respectively. An adapter plate 44 is bolted or otherwise connected to the main tool housing 22 for the purpose of retaining the boring tool 20 to the engine block. The boring tool 20 is mounted with the rotational axis of the output shaft 28 or 28' coaxial with the axis of the engine block opening which normally receives the cylinder sleeve.

Figure 12:
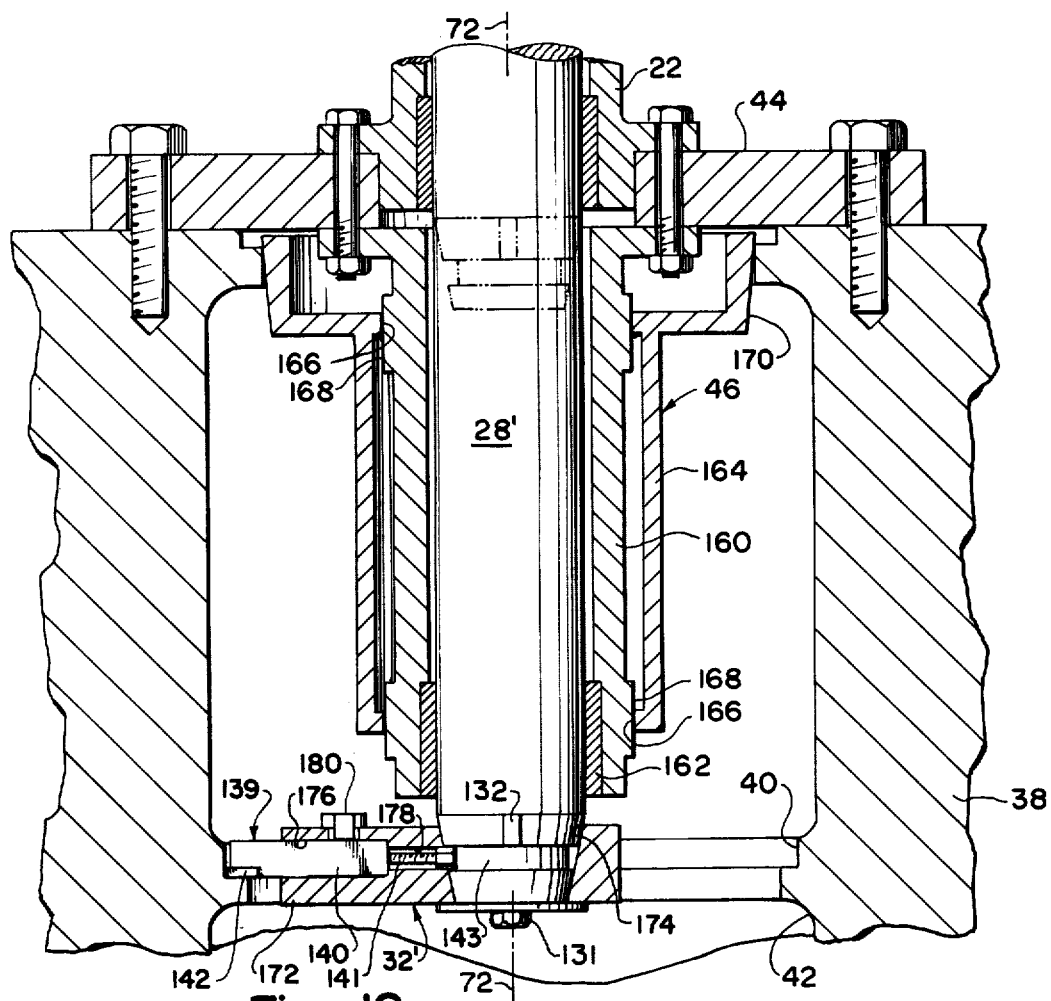
FIG. 12 is a partial vertical section view taken along the rotational axis of the boring tool of the present invention, illustrating the cutting of a lower counterbore.

In order to cut the lower counterbore 40, the output shaft 28 shown in FIG. 1 is manually removed from the tool 20 and the longer output shaft 28', shown in FIG. 12, is substituted. In addition, a lower housing subassembly 46 is operatively attached to the lower side of the adapter plate 44 opposite of the tool housing 22. The lower housing subassembly 46 stabilizes the lowermost end of the longer output shaft 28' during cutting of the lower counterbore 40 and positions the axis of the output shaft 28' in the proper location for cutting the lower counterbore 40. The tool holder and cutter subassembly 32' is attached to the output shaft 28' to cut the lower counterbore 40.

Figure 2:
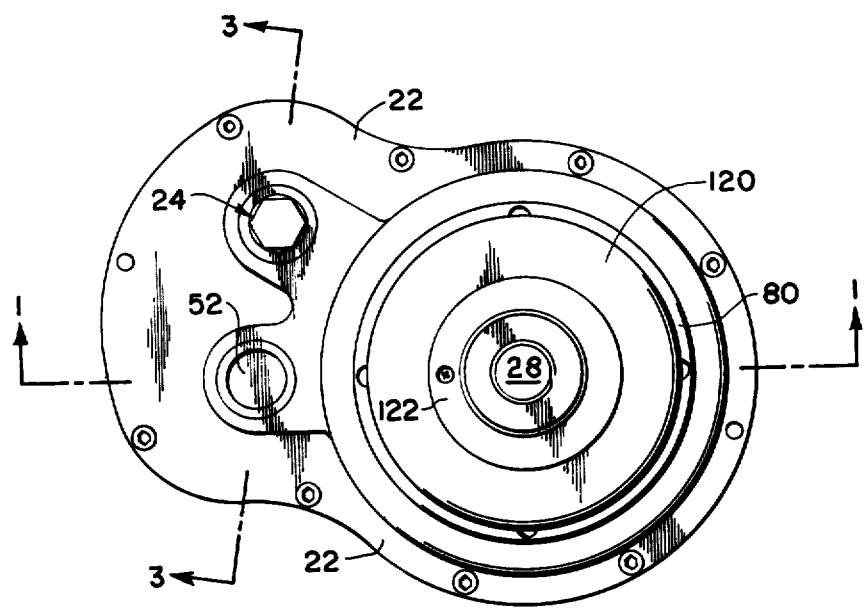
FIG. 2 is a top view of the boring tool shown in FIG. 1.
Figure 3:
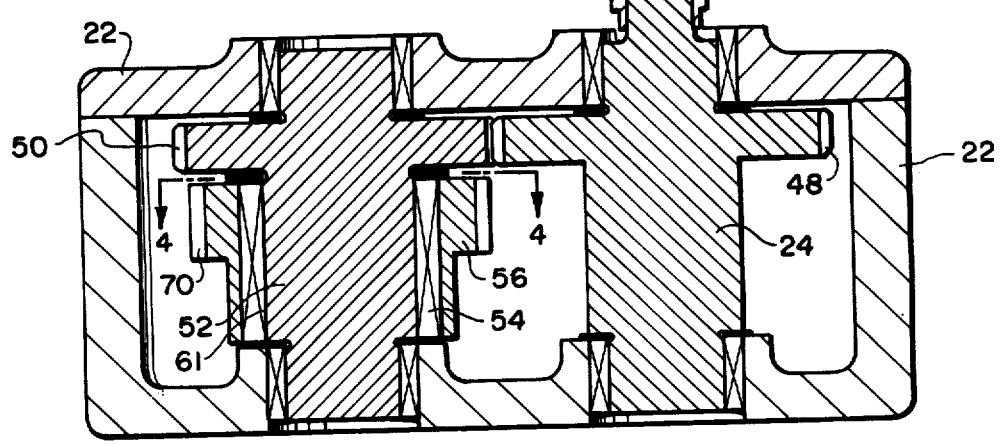
FIG. 3 is an enlarged section view taken substantially in the plane of line 3—3 of FIG. 2.
Figure 4:
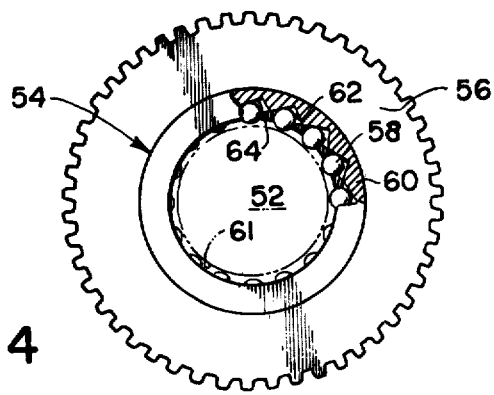
FIG. 4 is a section view taken substantially in the plane of line 4—4 of FIG. 3.

Power to the input shaft 24 is preferably applied from a conventional heavy-duty half-inch-drive electric drill, although other sources of rotational power could be utilized. The input shaft 24, as shown in FIGS. 2 and 3, is rotationally supported by conventional bearings in the housing 22. Gear teeth 48 integral with the input shaft 24 apply rotational force to gear teeth 50 of an idler gear 52 of the shaft rotating and advancing subassembly 26. The idler gear 52 is rotationally mounted by conventional bearings in the housing 22. A conventional clutch roller bearing assembly 54 operatively connects a clutch gear 56 to the idler gear 52, as is shown in FIG. 4.

One example of the clutch roller bearing assembly 54 is a bearing available under the designation TRA-1220 from the Torrington Company. As generally shown in FIG. 4, the clutch roller bearing assembly 54 comprises a plurality of cylindrically-shaped rollers 58 and a roller-supporting bearing housing 60. The exterior surface of the bearing housing 60 is cylindrical and is press-fitted in a firm frictional engagement into an interior annular opening in the clutch gear 56. The cylindrical rollers 58 contact the exterior cylindrical surface 61 of the idler gear 52. The bearing housing 60 includes, on corresponding opposite circumferential sides of each cylindrical roller 58, a sharply radially inward extending ramp 62 and a more gradual radially inward extending ramp 64. As the idler gear 52 is rotated counterclockwise, as shown in FIG. 4, each of the rollers 58 starts moving counterclockwise along the gradual ramps 64. The rollers 58 are forced or wedged radially inward by the gradual ramps 64 against the surface 61. Once sufficient radial wedging force is created by the movement of the rollers 58 along the ramp 64, the bearing housing 60 and the clutch gear 56 are operatively rigidly frictionally retained to the idler gear 52. Consequently, the clutch gear 56 will rotate counterclockwise in unison with the idler gear 52. The clutch gear will rotate in unison with the idler gear under this first condition of operation so long as a clockwise resistance torque on the clutch gear is present to maintain the rollers wedged between the ramps 64 and the cylindrical surface 61 of the idler gear, or so long as the counterclockwise rate of rotation of the clutch gear 56 is not greater than the counterclockwise rate of rotation of the idler gear 52. However, once the clockwise resistance torque is removed, or the clutch gear is rotated faster counterclockwise than the idler gear 52, thereby establishing a second condition of operation, the rollers 58 move clockwise relative to the gradual ramps 64 and encounter the sharp ramps 62. The sharpness of the radial inward inclination of each ramp 62 is not sufficient to allow the rollers 58 to move radially inward into frictionally engaging, wedging contact between the sharp ramps 62 and the idler gear 52. Instead, the rollers 58 roll freely on the surface 61 and against the sharp ramps 62, thereby allowing the clutch gear 56 and bearing housing 60 to rotate counterclockwise relative to the idler gear 52 without restraint. It is apparent, therefore, that the clutch roller bearing assembly 54 provides one example of clutch means for rotating the clutch gear in unison with the idler gear in one rotational condition while allowing the relative movement of the clutch gear relative to the idler gear in another condition of rotation.

Means for establishing a differential rate of rotation for advancing the output shaft 28 or 28' is provided by the idler gear 52 and the clutch gear 56 rotationally driving a shaft advancing or feed gear 66 and a shaft rotating or drive gear 68, respectively, as is shown in FIG. 1. The number of teeth 50 on the idler gear 52 is slightly greater than the number of teeth 70 on the clutch gear 56, as represented by the greater circumference of the idler gear at the teeth 50, as compared to the circumference of the clutch gear at the teeth 70 (shown best in FIG. 4). Both the feed gear 66 and the shaft drive gear 68 rotate about the rotational axis 72 of the output shaft 28 or 28'. The feed gear 66 rotates at a greater rotational rate than the shaft drive gear 68 because the circumference of the feed gear 66 at its teeth 74 is less than the circumference of the shaft drive gear 68 at its teeth 76. The feed gear 66 and shaft drive gear 68 are rotationally mounted in the tool housing 22 by conventional bearings and are held in assembled relation by a housing cover nut 80 which is threaded into the main tool housing 22.

A centrally located generally annular splined opening 82 is formed in the shaft drive gear 68. The splines of the opening 82 mate with and receive corresponding axially-oriented splines 84 formed near the upper full diameter end of the output shaft 28 or 28'. Accordingly, the output shaft 28 or 28' is rotated by and in unison with the shaft drive gear 68. However, the splines 82 and 84 allow the output shaft to be axially slipped out of engagement with the drive gear 68. The portions of the output shaft axially above the splines 84 are of reduced diameter so as not to interfere with the splined opening 82 as the output shaft is withdrawn from the boring tool 20.

A generally cylindrically-shaped feed gear housing 86 or rotational member extends upward from the feed gear 66. The feed gear housing 86 rotates within the internal cylindrical opening of the housing nut 80 and about the axis 72. The feed gear housing 86 carries the selective engaging and disengaging subassembly 30. The subassembly 30 operatively engages the output shaft 28 or 28' at any position along the predetermined axial length and extent of feed threads 88 which are formed on the output shaft 28 or 28'. Threaded engagement with the feed threads is necessary to axially advance the output shaft from operation of the boring tool.

Figure 5:
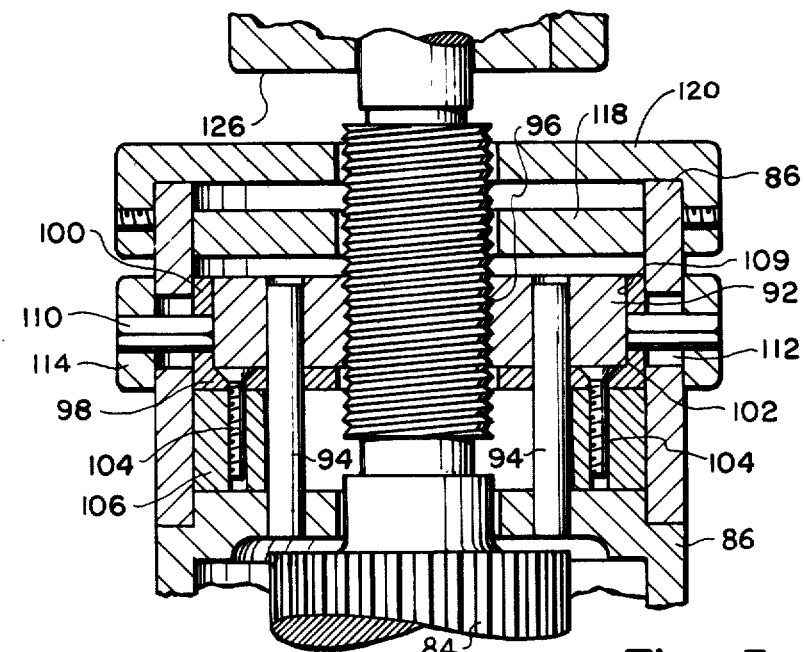
FIG. 5 is an enlarged view of a portion of FIG. 1, illustrating in greater detail a selective engaging and disengaging subassembly of the boring tool.

The selective engaging and disengaging means or subassembly 30 includes a split nut assembly 90 which, in its closed or locked position as shown in FIGS. 1 and 5, threadably engages the feed threads 88 of the output shaft and rotates in unison with the feed gear housing 86. In its open or unlocked position shown in FIG. 7, the split nut assembly 90 disengages with the feed threads 88 on the output shaft. The output shaft can be manually withdrawn from the tool 20, or the axial position of the output shaft can be manually adjusted without operating the boring tool 20 and rotating the feed gear 66 and shaft drive gear 68.

Figure 6:
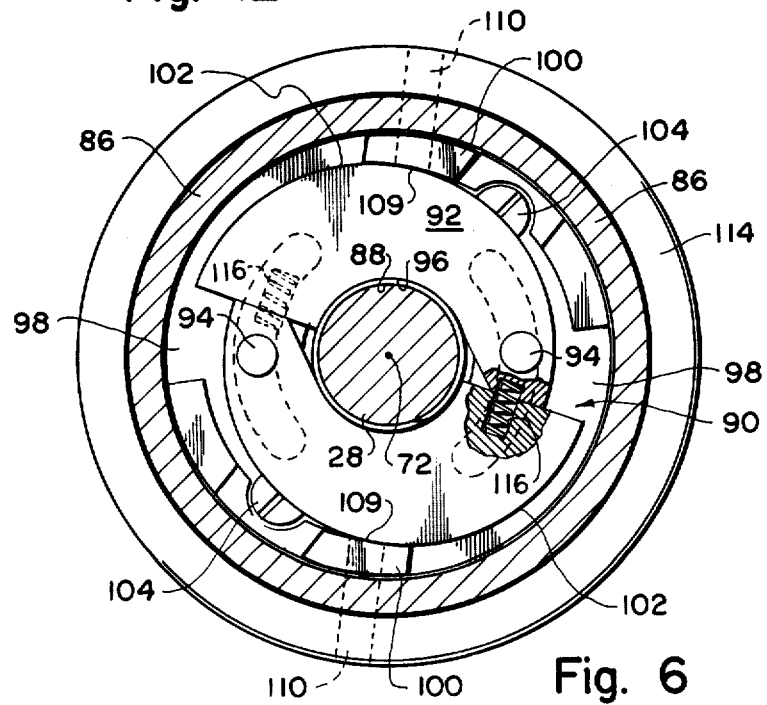
FIG. 6 is a section view taken substantially in the plane of line 6—6 of FIGS. 1 and 5.
Figure 7:
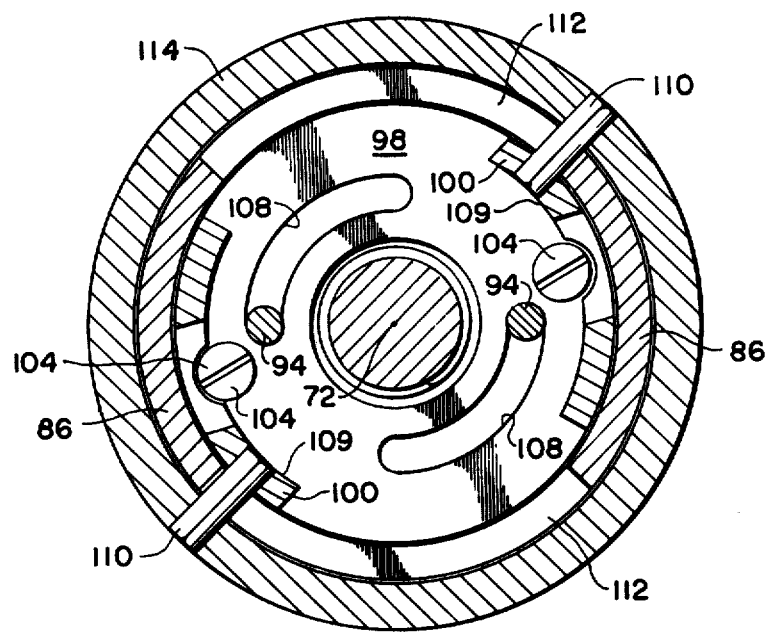
FIG. 7 is a section view taken substantially in the plane of line 7—7 of FIGS. 1 and 5.

The split nut assembly 90 is best illustrated in FIGS. 5 and 7. The split nut assembly comprises a pair of half or partial nut members 92, each of which is pivotally connected to a shaft 94. As is also shown in FIG. 1, each of the shafts 94 extends rigidly from the feed gear housing 86. Further, the shafts 94 are positioned diametrically opposite one another with respect to the rotational axis 72 and are equal distances from the rotational axis 72. An inner annular semicircular surface 96 of each half nut member 92 is threaded to receive the shaft feed threads 88 of the output shaft 28 or 28'. When in the locked or closed position illustrated in FIG. 5, the threaded surfaces 96 of both nut members 92 engage the substantial majority of the circumference of the feed threads 88. When in the unlocked or open position illustrated in FIG. 6, the annular threaded surfaces 96 move radially out of contact with the feed threads 88 and thereby release the operative connection to the output shaft 28 or 28'. The disengaging pivotal movement of the half nut members 92 is sufficient to avoid interference with the feed threads 88 as the output shaft is axially withdrawn, and also does not contact or interfere with any other reduced diameter end portion of the output shaft above the feed threads 88.

Means for unlocking or opening and for locking or closing the split nut assembly 90, by operatively moving or pivoting the half nut members 92 about the shafts 94, is provided by a cam plate 98, cam follower members 100 and eccentrically or spirally-shaped cam surfaces 102 formed on the radial outer edge of each half nut member 92, as is shown best in FIGS. 5 to 7. The cam plate 98 is located radially inward in noncontacting relation from the inner surface of the feed gear housing 86. The cam plate 98 is attached by screws 104 to an internal mounting ring 106 (FIG. 1). The mounting ring 106 is threadably engaged with the feed gear housing 86 and is free to rotate relative to the housing 86. Quarter circumference arc slots 108 (FIG. 6) are formed in the cam plate 98 and receive the shafts 94 therein. Accordingly, the cam plate 98 and the attached mounting ring 106 are free to rotate ninety degrees or one-fourth of a revolution about the axis 72 until the ends of the slots 108 contact the shafts 94. The cam follower members 100 extend axially upward at diametrically opposite positions near the outer edge of the cam plate 98. Curved radial inner surfaces 109 of the cam follower members 100 contact the outer eccentric surface 102 of each half nut member 92. Pins 110 extend radially outward from the cam follower members 100 through slots 112 formed through the feed gear housing 86. The outer ends of the pins 110 connect to an adjustment ring 114. The adjustment ring 114 is spaced circumjacent the outer surface of the feed gear housing 86. Rotation of the adjustment ring 114 rotates the cam plate 98. Springs 116 (FIGS. 6 and 8) extend between the relatively immoveable end of each half nut member 92 and the relatively moveable or pivoted end of the other half nut member 92. The springs 116 are received in openings (FIG. 6) formed in the ends of half nut members.

Figure 8:
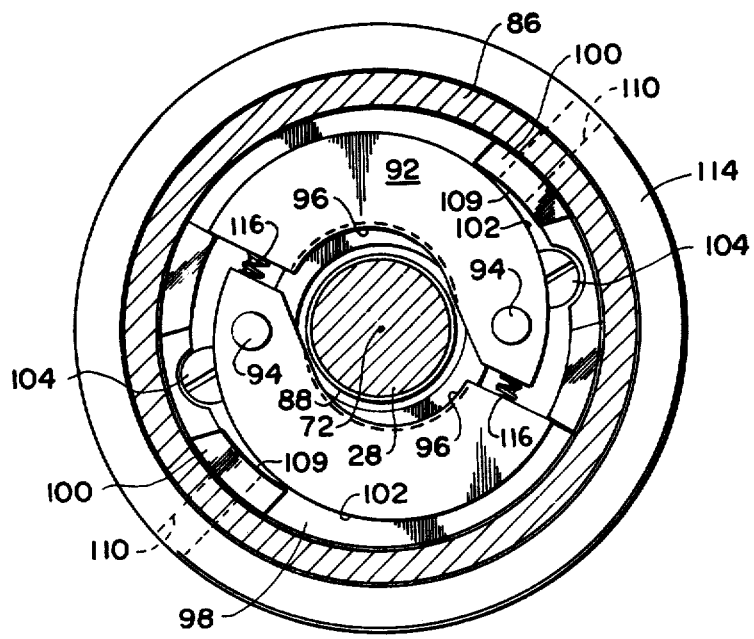
FIG. 8 is a view similar to FIG. 6 illustrating a different operative position of a split nut assembly as compared to that shown in FIG. 6.

In order to lock the split nut assembly and thereby close the half nut members 92 on one another and engage the feed threads 88 as shown in FIG. 6, the adjustment ring 114 is rotated counterclockwise as shown in FIG. 6. The surface 109 of the cam follower member 100 slides counterclockwise along the spiral eccentric surface 102 of each half nut member 92 and forces each half nut member to pivot radially inward about the shaft 94 to which it is connected. Radial inward movement is achieved as a result of the counterclockwise spirally increasing radial distance (FIGS. 6 and 8) between the surfaces 102 and 96 of each half nut member. Upon sufficient counterclockwise rotation of the adjustment ring, which is less than ninety degrees, the split nut members contact one another and the threads at 96 of each half nut member firmly engage the threads 88 on the output shaft 28 or 28'. To disengage the threads at 96 from the feed threads 88 to release the threaded engagement of the half nut members 92 with the threads 88 of output shaft 28, the adjustment ring 114 is rotated clockwise, as shown in FIG. 8. The surface 109 of the cam follower member 100 slides clockwise along the surface 102 toward the shaft 94 to which each half nut member is connected. The bias from the springs 116 force the half nut members to pivot outward about the shafts 94, and such movement is allowed because of the clockwise spirally decreasing radial distance between the surfaces 102 and 96 of each half nut member 92. Upon reaching the unlocked position shown in FIG. 8, the threaded engagement of the threads 88 and at 96 is released to allow the shaft 28 or 28' to be manually positioned or removed from the boring tool 20.

As shown in FIG. 5, a take-up nut 118 is threaded internally into the upper open end of the gear feed housing 86 to axially retain the elements of the split nut assembly 90 within the interior of the feed gear housing 86. A cap 120 is rigidly attached to the exterior axial end of the feed gear housing 98 by a set screw. It is understood from the foregoing description that the split assembly 90 is operatively connected to and rotates in unison with the feed gear housing 86.

A differential rotational rate is established between the output shaft 28 or 28' and the split nut assembly 90 which threadably engages the feed threads 88, for the purpose of axially advancing the output shaft. The split nut assembly 90 rotates slightly faster than the rotational rate of the output shaft, because of the previously described gear tooth and circumferential relationships of the idler gear 52, clutch gear 56, feed gear 66 and shaft drive gear 68. The rate of axial advancement of the output shaft 28 or 28' is controlled by the difference in relative rotational rates. For example, should the feed gear 66 and split nut assembly 90 be rotating at three hundred revolutions per minute, and the shaft drive gear 68 and output shaft and feed threads 88 be rotating at two hundred ninety revolutions per minute, a differential rotational rate of ten revolutions per minute is established. If the pitch of the threads 88 and at 96 is, for example, twenty threads per inch, each minute of operation of the boring tool 20 will result in the axial advancement of the shaft 28 or 28' by ten relative rotations or ten threads or one half inch. Thus, in this example, the shaft 28 or 28' will rotate two hundred ninety revolutions for each one half inch of axial advancement. It can thus be appreciated that the differential rate features of the boring tool 20 result in a relatively high number of revolutions of the output shaft as compared to a relatively small axial advancement. The relatively high rate of rotation as compared to axial advancement is advantageous in securing a smooth even cut in the engine block material, without causing chattering of the cutter against the engine block material resulting in an uneven counterbore surface.

To control the maximum extent of axial advancement of the shaft, and thereby establish the maximum depth of cut for the counterbore, a stop nut 122 is employed. The stop nut 122 is threadably attached to the terminal reduced-diameter threaded end 124 of the shaft 28 or 28', as shown in FIGS. 1 and 5. The distance between a lower shoulder 126 of the stop nut 122 and the upper surface of the cap 120 establishes the desired maximum depth of the cut. Initially, the cutting element of the tool holder and cutter subassembly 32 (FIG. 1) is moved axially downward until it contacts the starting surface where the counterbore is to be cut. Next, the counterbore insert or repair sleeve is inserted between the top surface of the cap 120 and the shoulder 126. The stop nut 122 is then threaded downward until it contacts the counterbore insert or repair sleeve. At that point, the maximum depth of the counterbore is established and is equal to the thickness of the counterbore insert or repair sleeve. Convention means (not shown) is employed in the stop nut 122 to prevent it from rotating on the threads 124 after its axial position is established.

Axial cutting of the counterbore will continue until the shoulder 126 contacts and engages the upper surface of the cap 120. Once a firm frictional engagement occurs, the output shaft 28 or 28' begins rotating at the greater rotational rate as and in unison with the feed gear housing 86. The torque applied from the faster rotating cap 120 to the stop nut 122 is transferred through the shaft 28 or 28' to the shaft drive gear 68. The shaft drive gear 68 begins rotating in unison with the feed gear 66. The gear ratio between the shaft drive gear 68 and the clutch gear 56 causes the clutch gear 56 to rotate at a slightly greater rate than the rotational rate of the idler gear 52. The frictional engagement of the cylindrical rollers 58 (FIG. 4) between the gradual ramp 64 and the outer cylindrical surface 61 of the idler gear 52 is released. The clutch roller bearing assembly 54 begins operating in its freewheeling or clutching mode. In this condition of operation, the clutch roller bearing 54 offers no resistance to rotation of the clutch gear 56 on the idler gear 52, and no differential rotational rate exists between the output shaft and the split nut assembly. Hence, axial advancement of the output shaft is terminated. A predetermined maximum extent of cutting depth is reliably achieved by use of simple and reliable mechanical components. The mechanic perceives completion of cutting the counterbore by an increase in speed and decrease in torque on the electric drill applying force to the input shaft 24.

To allow the output shaft to be removed from the boring tool 20, the stop nut 122 is threaded off of the threaded end 124 of the output shaft 28 or 28'. The reduced diameter of the end 124 creates no interference with the threads 96 of the split nut assembly 90 or the splined opening 82 of the shaft drive gear 66, since both are located at greater radial positions with respect to the axis 72 in the boring tool 20.

Figure 9:
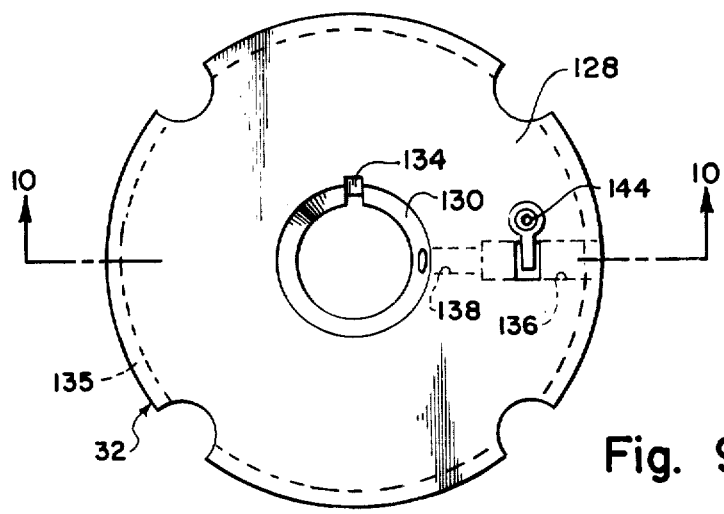
FIG. 9 is a section view taken substantially in the plane of line 9—9 of FIG. 1, illustrating a cutting tool holder rotated one hundred eighty degrees from that position shown in FIG. 1.
Figure 10:
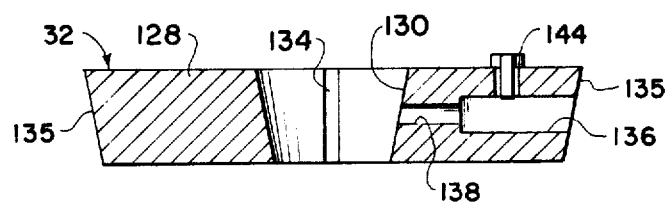
FIG. 10 is a section view taken substantially in the plane of line 10—10 of FIG. 9.

The tool holder and cutter subassembly 32 used for cutting the upper counterbore 34 is best illustrated in FIGS. 1, 9 and 10. The lower end of the output shaft 28 is frustoconically-shaped to center thereon a tool holder disc member 128. A correspondingly-shaped center frustoconically-shaped opening 130 of the disc member 128 receives the frustoconically-shaped lower end of the shaft 28. The disc member 128 is retained to the shaft by a washer and bolt 131 threaded into the lower end of the output shaft 28. A key 132 in keyways 134 between the disc member 128 and the frustroconical end of the output shaft prevents relative rotation of the disc member on the output shaft. An outer circular surface 135 of the disc 128 is frustoconically tapered to converge radially inward toward the end of the output shaft. An opening 136 of generally square cross section extends radially into the disc member 128 from the outer tapered surface 135. An opening 138 of generally cylindrical configuration extends from the inner terminal end of the square opening 136 to the center opening 130. A bit holder 139 is received within the square opening 136 and the cylindrical opening 138. The bit holder 139 comprises a rectangular block member 140 of square cross section, an adjustment screw 141 threaded into the block member 140, and a cutting bit 142 attached to the block member 140. The block member 140 is slideably received within the square opening 136 with enough side clearance to freely slide radially along the opening 136 but not to wobble from side to side or up and down in the opening 136. The adjustment screw 141 extends within the cylindrical opening 138 but does not contact the side walls of the opening 138. The total length of the bit holder 139 between the outermost cutting edge of the cutting bit 142 and the head of the adjustment screw 141 is adjusted by relative rotation of the block 140 and screw 141 prior to inserting the bit holder 139 in the openings 136 and 138. An annular groove 143 (FIGS. 1 and 12) is formed in the lower end of the shafts 28 and 28' to receive the radial inner head end of the adjustment screw 141. The groove 143 establishes a reliable reference relative to the axis of output shafts 28 or 28' for establishing the diameter of the counterbore 34. Of course, the diameter of the upper counterbore 34 is selected in accordance with the diameter of the upper counterbore insert. Once the proper length of the bit holder has been established and the bit holder is inserted into the openings 136 and 138, the tool holder is held firmly in place by a conventional clamp holder 144. The clamp holder 144 is attached to the disc member 128 and contacts the block member 140.

Figure 11:
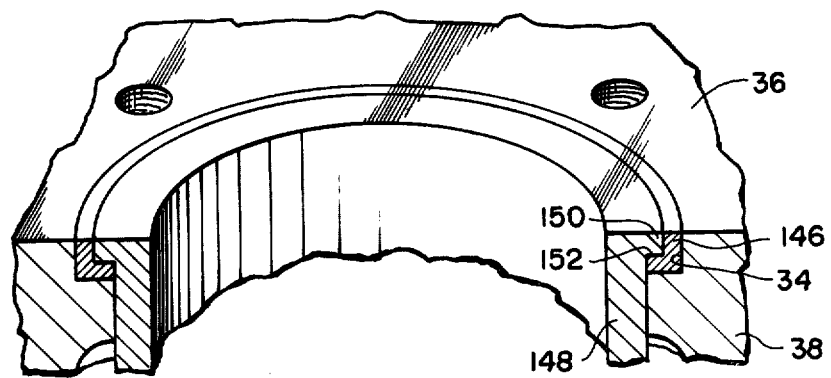
FIG. 11 is a partial perspective sectioned view of a portion of the upper end of a cylinder sleeve, the upper counterbore, an upper counterbore insert and the engine block.

Cutting the upper counterbore 34 is accomplished by use of the shorter output shaft 28 and tool holder and cutter subassembly 32, shown in FIG. 1. The boring tool is positioned properly on the engine block 38 by contacting the tapered surface 135 of the disc member 128 with the cylindrical opening in the block where the upper counterbore 34 is to be cut. After positioning the tool 20 and firmly attaching it to the engine block, the output shaft is moved away from the engine block a sufficient distance to insert the bit holder 139 in the openings 136 and 138. The bit holder is firmly attached to the disc member 128 by tightening the clamp holder 144. Cutting the upper counterbore 34 proceeds in the manner described. After the upper counterbore is cut and the tool 20 is removed from the upper deck 36, an upper counterbore insert 146 is press-fitted into the upper counterbore 34, as shown in FIGS. 11 and 12. Prior to press-fitting the counterbore insert 146 into the counterbore 34, a coating of conventional sealing material is applied to the exterior surfaces of the counterbore insert 146 which contact the surfaces of the counterbore 34, in order to prevent coolant leaks. Thereafter, the cylinder sleeve 148 is inserted through the annular center opening of the counterbore insert 146, and the upper lip 150 of the cylinder sleeve 148 seats in the stepped recess 152 of the insert 146. The lip 150 seats in the stepped recess 152 of the insert in the same manner that it previously seated in a previous stepped recess of the engine block. Of course, the previous stepped recess in the engine block was cut away when the upper counterbore 34 was cut into the engine block.

In order to cut the lower counterbore 40, the longer output shaft 28' is utilized, as shown in FIG. 12. The longer output shaft 28' is inserted into the boring tool 20 by moving the adjustment ring 114 to expand the half nut members 92 of the split nut assembly 90 (FIG. 8) and disengage the feed threads 88 of the shorter shaft 28. In order to selectively retain the output shaft in the tool 20 while the split nut assembly 90 is operated to release engagement with the feed threads 88, means including a plunger member 154 is provided, as shown in FIG. 1. Once the engagement of the feed threads 88 is released, the plunger 154 is manually moved outward to release the contact of its inner end 156 with an annular groove 158 formed in the output shaft. The plunger 154 is held outward as one shaft is removed and another shaft is inserted. Once the new shaft, for example the longer shaft 28', has been inserted, the plunger 154 is released and the end 156 moves back into the groove 158 and holds the newly inserted output shaft in the boring tool 20. The adjustment ring 114 is operated to engage the threaded surface 96 of the split nut assembly 90 with the shaft feed threads 88 on the newly inserted shaft. It should be noted that the plunger 154 includes means (not shown) for retaining it in an outward position wherein its inner end 156 does not extend into the groove 158, when the tool is in use. In its outer retained position, the end 156 of the plunger 154 does not interfere with the axial advancement of either shaft 28 or 28' or the removal of the output shaft from the tool 20.

The housing extension subassembly 46 comprises an inner housing extension member 160 which is connected to the main housing 22 on the opposite side of the adapter plate 44, as shown in FIG. 12. The inner housing extension member 160 extends coaxially with the axis 72 and includes suitable bushings 162 or other means for contacting the exterior cylindrical surface of the longer output shaft 28' adjacent its lower terminal end and thereby supporting the lower end of the longer shaft 28' against wobbling and other spurious movement. The bushing 162 is similar to other bushings (FIG. 1) operative within the main tool housing 22.

In order to operatively position the boring tool 20 for cutting the lower counterbore 40, an exterior centering housing 164 is positioned over the inner housing extension member 156, as shown in FIG. 12. The centering housing 164 includes inner surfaces 166 which contact mating outer surfaces 168 on the housing extension member 160 to locate the centering housing 162 coaxially with respect to the rotational axis 72. In order to position the output shaft 28' at the proper location for cutting the lower counterbore 40 coaxially with respect to the existing opening in the engine block, an outer frustoconically-shaped surface 170 extends from the upper end of the centering housing 164 to contact the engine block 38 at the upper counterbore or at the area where the upper counterbore will be formed. In this manner, the rotational axis 72 is coaxially aligned with the axis in the engine block opening which receives the cylinder sleeve.

The tool holder and cutter subassembly 32' used for cutting the lower counterbore 40 comprises an arm 172 which is substantially rectangular in shape. Positioning of the boring tool 20 is achieved as a result of the frustoconical surface 170 of the centering housing 164, so no centering arrangement similar to the tapered surface 135 (FIG. 1) is required on the arm 172. The arm 172 includes a frustoconical opening 174 which receives the tapered end of the output shaft 28'. A keyway is formed in the opening 174 to receive the key 132. Openings 176 and 178 extend radially from the opening 174 to the outer end of the arm. The opening 176 is square in cross section to receive therein the block 140 of the bit holder 139 and the opening 178 is cylindrical to receive therein the adjustment screw 141. A conventional clamp holder 180 is attached to the arm 172 for the purpose of firmly holding the bit holder 139 in place.

Figure 13:
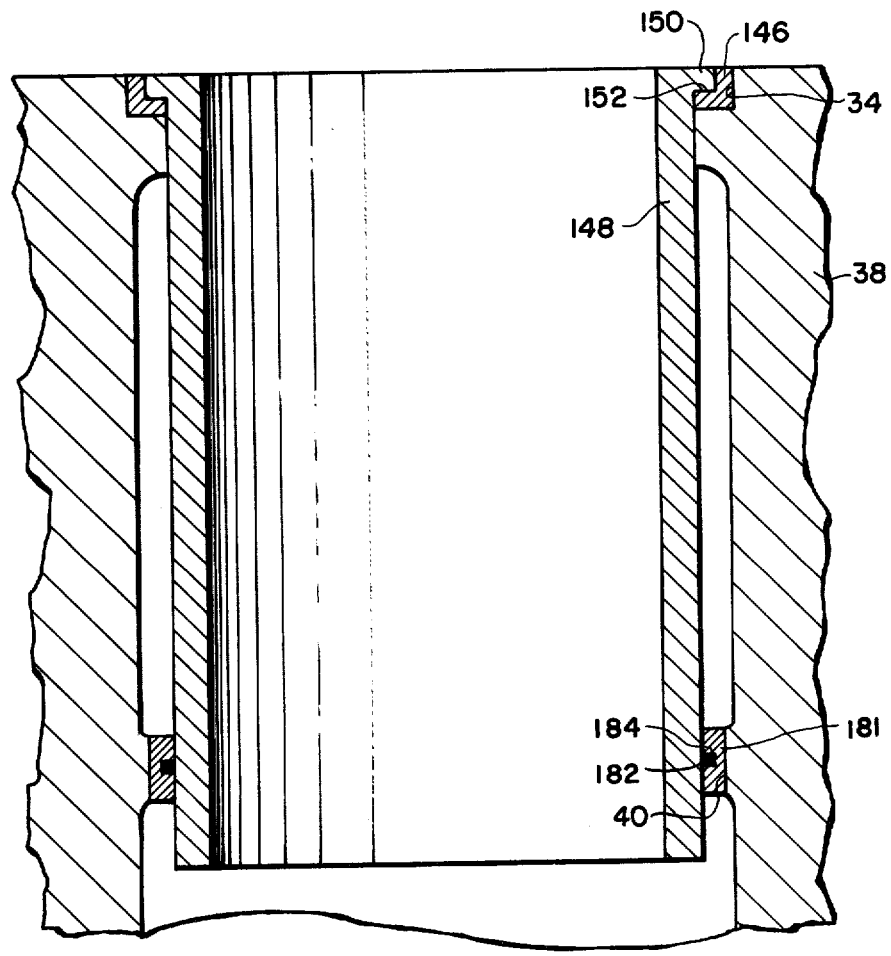
FIG. 13 is a vertical section view through a portion of the engine block, the cylinder sleeve, the upper and lower counterbores, a lower repair sleeve and the upper counterbore insert.

Boring the lower counterbore proceeds in the manner described by employing the longer output shaft 28' and the tool holder and cutter subassembly 32'. After the lower counterbore 40 has been formed, a lower repair sleeve 181 is frictionally fitted in the lower counterbore 40, as shown in FIG. 13. A coating of conventional sealant is applied to the outer surface of the repair sleeve 181 to prevent coolant leaks. Thereafter, the cylinder sleeve 148 is inserted. An O-ring sealing device 182 is carried in an internal groove 184 of the repair sleeve 181 and contacts the exterior surface of the cylinder sleeve 148 to prevent coolant leakage.

It is apparent from this description that there is provided a reliable and effective mechanical means for establishing differential rates of rotation for axially advancing and terminating the axial advancement of the output shaft. The features for selectively engaging and disengaging the output shaft allow the output shaft position to be quickly and conveniently adjusted for cutting both the upper and lower counterbores, and retracted after cutting is complete, rather than the much slower procedure of operating the boring tool to position the output shaft, as is commonly required in prior boring tools. Furthermore, the output shaft selective engaging and disengaging features allow different length output shafts to be quickly and readily substituted and employed. Separate complete boring tools for cutting the upper counterbore and the lower counterbore are unnecessary. The lower housing extension member assures adequate support for the longer output shaft to achieve a smooth cut of the lower counterbore. The lower centering housing allows the boring tool 20 to be easily positioned coaxially with the axis of the cylinder sleeve opening in the engine block. Many other advantages are apparent from this disclosure.

A preferred embodiment of the present invention has been shown and described with a degree of particularity. It should be understood, however, that changes in details are possible without departing from the scope of the invention defined by the appended claims.

What is claimed is:

1. In a boring tool comprising input means for applying operational power to the boring tool, an output shaft adapted for operatively supporting a cutfing tool therefrom, shaft rotating means operatively connecting the input means and the output shaft for rotating the output shaft, shaft advancement means operatively connecting the input means and the output shaft for axially advancing the output shaft, the shaft advancing means including a rotational member operatively connected to the input means to be rotated at a rate different than the rate at which the output shaft is rotated by the shaft rotating means, the output shaft including feed threads formed thereon, threaded means adapted for threadably engaging the feed threads of the output shaft, said threaded means operatively connected to the rotational member to axially advance the output shaft upon relative rotation of the output shaft and the rotational member during threaded engagement of the threaded means and the feed threads, and an improvement in combination therewith:

wherein said threaded means comprises a plurality of partial nut members, each partial nut member having a threaded surface adapted for engaging a portion of the feed threads of the output shaft, each partial nut member operatively connected to the rotational member to rotate with the rotational member and to move toward and away from the feed threads of the output shaft, the rotational member operatively retained to rotate about an axis coaxial with the rotational axis of the output shaft; and further comprising means operatively contacting each partial nut member for selectively moving each partial nut member toward the output shaft to engage the threaded surface of the partial nut member with the feed threads of the output shaft and for selectively moving each partial nut member away from the output shaft to disengage the threaded surface of each partial nut member from the feed threads of the output shaft.

2. An invention as defined in claim 1 wherein each partial nut member is pivotably connected to the rotational member, and each partial nut member includes an outer surface extending eccentrically with respect to the axis of rotation, and said means for selectively moving each partial nut member comprises a cam follower member slideably contacting the outer eccentric surface of each partial nut member.

3. An invention as defined in claim 2 further comprising a cam plate operatively connected for rotation relative to the rotational member, each cam follower member operatively connected to the cam plate, and adjustment means exposed to the exterior of said tool and operatively connected for rotating said cam plate.

4. An invention as defined in claims 1, 2 or 3 wherein said boring tool includes an exterior housing, and further comprising selective shaft retention means connected to the housing for selectively retaining the output shaft to the boring tool upon selective disengagement of the feed threads.

5. An invention as recited in claim 4 wherein said selective retention means comprises an indention formed in the output shaft, and plunger means biased from the housing to extend into the indention formed in the output shaft.

6. In a boring tool comprising input means for applying operational power to the boring tool, an output shaft adapted for operatively supporting a cutting tool therefrom, shaft rotating means operatively connecting the input means and the output shaft for rotating the output shaft, a shaft feed gear operatively connected to the input means and retained on said tool for rotation coaxial with respect to the output shaft, a feed gear housing connected to the shaft feed gear, the output shaft including feed threads formed thereon, threaded means operatively connected to the feed gear housing and adapted for threadably engaging the feed threads of the output shaft to axially advance the output shaft upon relative rotation of the output shaft and the feed gear housing during threaded engagement of the threaded means with the feed threads, and an improvement in combination therewith comprising:

a split nut assembly operatively connected to the feed gear housing, the split nut assembly including a plurality of partial nut members, each partial nut member having a threaded surface adapted for engaging a portion of the feed threads, said threaded means comprising the threaded surface of each partial nut member;

means connecting each partial nut member to the feed gear housing for pivoting each partial nut member toward and away from the output shaft; and means for selectively moving each partial nut member to threadably engage the threaded surface thereof with the feed threads of the output shaft and to selectively disengage the threaded surface of each partial nut member with the feed threads, whereby the output shaft position can be axially adjusted within said boring tool without relative rotation of the output shaft and the feed gear housing.

7. An invention as defined in claim 6 further comprising an exterior cam-shaped surface formed on each partial nut member, a cam plate operatively rotationally connected to the feed gear housing, one cam follower member operatively connected to the cam plate to contact each cam surface of each partial nut member, and an adjustment member operatively connected to the cam plate and exposed to the exterior of the boring tool, movement of the adjustment member operatively moving each cam follower member along the cam surface of a partial nut member to pivot each partial nut member and bring the threaded surface into and out of threaded engagement with the feed threads of the output shaft.

8. A boring tool for cutting a counterbore or the like in an engine block or the like by rotating and axially advancing a cutting tool, comprising input means for applying operational power to the boring tool, an output shaft adapted for operatively supporting the cutting tool therefrom, shaft rotating means operatively connected to the input means for rotating the output shaft, shaft advancement means operatively connected to the input means for axially advancing the output shaft, means for connecting the shaft rotating means to the output shaft, means for connecting the shaft advancing means to the output shaft, means operatively associated with both said shaft connecting means for operatively releasing all connection between the output shaft and the shaft advancing means and the shaft rotating means to allow removal of the output shaft from the boring tool, and an improvement in combination therewith comprising:

a pair of output shafts selectively connectable for use one at a time in said boring tool, one of said output shafts being longer than the other output shaft, the shorter output shaft for cutting an upper counterbore in the engine block, the longer output shaft for cutting a lower counterbore in the engine block, and a housing extension member connectable to the boring tool and including means for supporting the longer output shaft near the end thereof upon which the cutting tool is supported.

9. A boring tool for cutting a counterbore or the like in an engine block or the like by rotating and axially advancing a cutting tool, comprising input means for applying operational power to the boring tool, a first output shaft of predetermined length, shaft rotating means operatively connected to the input means for rotating the output shaft, shaft advancement means operatively connected to the input means for axially advancing the output shaft, means for connecting the shaft rotating means to the output shaft, means for connecting the shaft advancing means to the output shaft, means operatively associated with both said shaft connecting means for operatively releasing all connection between the output shaft and the shaft advancing means and the shaft rotating means to allow removal of the output shaft from the boring tool, a main housing operatively retaining said input means and said shaft rotating means and said shaft advancement means and the first output shaft, and an improvement in combination therewith comprising:

a second longer output shaft of predetermined length greater than the predetermined length of the first output shaft for selective connection in said tool alternatively to said first output shaft, the longer output shaft extending out of the main tool housing a substantially greater distance than the first output shaft, and a housing extension member for operative rigid connection to the main housing, the housing extension member including means for supporting the longer output shaft at a position generally adjacent its terminal end.

10. An invention as defined in claim 9 further comprising a centering housing for operative retention exteriorly of the housing extension member, the centering housing including means for positioning the longer output shaft coaxially with respect to the axis of an opening in the engine block into which the counterbore is to be bored.

11. An invention as defined in claim 10 wherein the centering housing and said housing extension member each include mating surfaces for supporting the centering housing from the housing extension member, and said centering housing further includes a frustoconically-shaped centering surface for contacting the engine block and centering the output shaft with respect to the engine block opening.

* * * * *